United States Patent
Littlejohn et al.

(10) Patent No.: US 6,733,852 B2
(45) Date of Patent: May 11, 2004

(54) DISPOSABLE SERVING PLATE WITH SIDEWALL-ENGAGED SEALING COVER

(75) Inventors: Mark B. Littlejohn, Appleton, WI (US); Rebecca E. Whitmore, Chilton, WI (US); Jerome G. Dees, Appleton, WI (US)

(73) Assignee: Georgia-Pacific Corporation, Atlanta, GA (US)

( * ) Notice: Subject to any disclaimer, the term of this patent is extended or adjusted under 35 U.S.C. 154(b) by 0 days.

(21) Appl. No.: 09/921,264

(22) Filed: Aug. 2, 2001

(65) Prior Publication Data

US 2002/0037378 A1 Mar. 28, 2002

Related U.S. Application Data

(60) Provisional application No. 60/223,209, filed on Aug. 4, 2000.

(51) Int. Cl.[7] .............................................. B65D 41/16
(52) U.S. Cl. ................... 428/35.7; 428/34.1; 428/36.5; 428/36.6; 428/36.8; 220/23.86; 220/780; 220/781; 206/501
(58) Field of Search ........................... 428/34.1, 35.7, 428/36.5, 36.6, 36.8; 220/4.21, 780, 784, 790, 4.22, 4.23

(56) References Cited

U.S. PATENT DOCUMENTS

| | | | | |
|---|---|---|---|---|
| 4,505,962 A | * | 3/1985 | Lu | 428/36.5 |
| 4,911,978 A | * | 3/1990 | Tsubone et al. | 428/317.9 |
| 4,960,639 A | * | 10/1990 | Oda et al. | 428/34.5 |
| 5,220,999 A | * | 6/1993 | Goulette | 206/45.32 |
| 5,377,860 A | * | 1/1995 | Littlejohn et al. | 220/306 |
| 5,427,266 A | * | 6/1995 | Yun | 220/377 |
| 5,500,261 A | * | 3/1996 | Takei et al. | 428/35.7 |
| 6,120,863 A | * | 9/2000 | Neculescu et al. | 428/35.7 |
| 6,440,509 B1 | * | 8/2002 | Littlejohn et al. | 428/35.7 |

FOREIGN PATENT DOCUMENTS

| | | | | |
|---|---|---|---|---|
| JP | 53-84044 | 12/1976 | | C08L/23/12 |
| JP | 59-209520 | 5/1983 | | B65D/1/00 |

* cited by examiner

*Primary Examiner*—Harold Pyon
*Assistant Examiner*—Walter B Aughenbaugh
(74) *Attorney, Agent, or Firm*—Michael W. Ferrell

(57) ABSTRACT

In a preferred construction, a food container includes: (i) a container base such as a serving planer, plate or howl having (a) a substantially planar central area, (b) a container base sidewall extending outwardly and upwardly from the central area having: (1) a recessed frustal tapered container base sealing area formed in the container base sidewall, and (2) a container base stop ridge adjacent the frustal tapered container base sealing area, and (c) an outwardly extending convex rim adjoining the container base stop ridge having an outer lip formed thereabout; and (ii) a resilient mating domed lid.

80 Claims, 9 Drawing Sheets

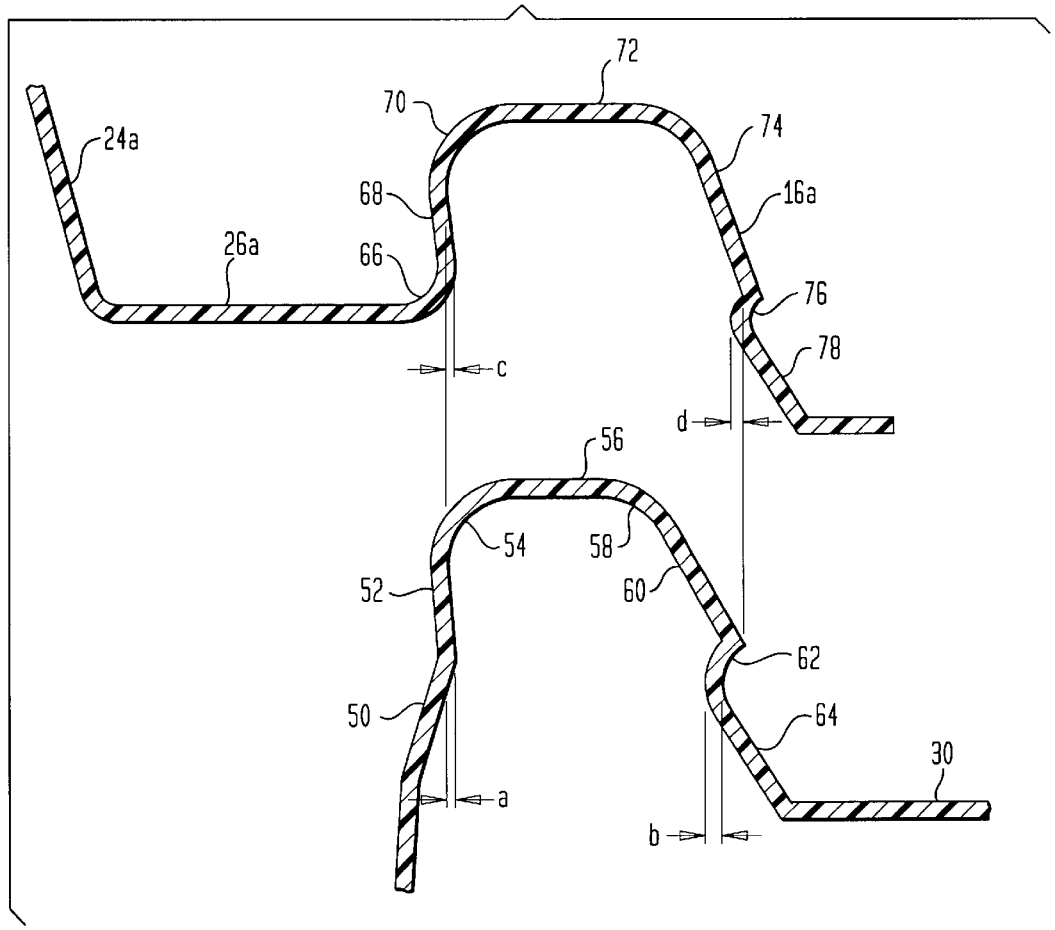

DISPOSABLE SERVING PLATE WITH SIDEWALL-ENGAGED SEALING COVER

CLAIM FOR PRIORITY

This application is based upon and incorporates material appearing in co-pending Provisional Application U.S. Ser. No. 60/223,209, filed Aug. 4, 2000 of the same title, the priority of which is claimed.

TECHNICAL FIELD

The present invention relates generally to food containers and more particularly to a serving plate with a sealing cover so as to provide for storage and transport as well as serving of the food contained therein.

BACKGROUND

Sealable food containers are known in the art. Illustrative in this respect is U.S. Pat. No. 5,377,860 to Littlejohn et al. In the '860 patent there is disclosed a serving platter or base with an upwardly projecting sidewall integrally formed with a brim. The brim is formed with a number of integrally formed and cooperating features including a reinforcing hoop 50 (see FIG. 10 thereof, FIG. 1A herein) which is angled outwardly and connected to a sealing area 52 which is frusto-conical in shape and is tapered inwardly. Area 52, in turn, is connected to an upwardly and outwardly flared first base alignment surface 54 which extends to a resilient base realignment surface 56. Surface 56 extends to a second base realignment surface 58 which is coupled to an outwardly and downwardly extending surface 60. An undercut secondary sealing ridge 62 is formed in the outermost extremity of the surface 60. In order to aid in the structural integrity of this brim of the base, a downwardly and outwardly flared peripheral base reinforcing hoop 64 is provided between the undercut secondary seal ridge 62 and the reinforcing ring 30.

The lid or cover configured to fit the platter includes a dome with an extension 24a adjacent a connecting ring 26a which, in turn, extends out to brim 16a of the lid. The brim includes an upwardly and outwardly extending alignment surface 66 connected to an inwardly tapered frusto-conical lid seal area 68. Lid seal area 68 adjoins an upwardly and outwardly flaring wall portion 70 which connects to a resilient lid realignment surface 72. A flaring reinforcing hoop 74 extends downwardly from surface 72 to a lid seal furrow 76. Lid seal furrow 76 of the lid cooperates with secondary sealing ridge 62 of the base to form a secondary seal between the lid and plate, whereas the base seal cover 52 cooperates with lid surface 10 seal area 68 to form the primary seal.

Thus, in accordance with the '860 patent, there is provided a food container with a dual flexible brim seal between the lid and base portion by way of the respective brim designs.

The present invention is likewise directed to a sealable food container, wherein the base is in the form of a plate or platter provided with a sidewall and an arcuate flange portion as well as a sealing lid which engages the sidewall of the plate. As such, the present invention provides enhanced hand feel and utility as a food service article as opposed to being designed particularly for storage and re-heating. Preferred embodiments are enabled by way of the novel sidewall sealing system which makes it possible to preserve the aesthetics of the serving plate or platter.

SUMMARY OF INVENTION

There is thus provided in accordance with the present invention a sealable food container including: (a) a base serving member having a substantially planar central portion, a sidewall extending generally upwardly and outwardly therefrom and an outer flange portion extending outwardly from the sidewall; which sidewall defines a sealing area with an annular sealing surface between the substantially planar central portion of the base serving member and its outer flange portion; the sidewall further defining a base stop ridge at a periphery of the sealing area of the sidewall; and (b) a sealing lid provided with a dome portion and a flexible sidewall extending downwardly from the dome portion as well as a flange portion extending outwardly with respect to the downwardly extending sidewall; the flange portion defining a sealing area with another annular sealing surface extending upwardly with respect to the downwardly extending sidewall of the sealing lid; and the flange portion further defining a lid stop ridge. The base serving member and the sealing lid are configured such that when the sealing lid is forced downwardly on the base serving member the annular sealing surface of the sealing lid is urged into surface-to-surface contact with the annular sealing surface of the base serving member and secured by cooperation of the base stop ridge of the base serving member and the lid stop ridge of the sealing lid.

In another aspect of the invention, there is provided a food container which includes: (i) a container base having (a) a substantially planar central area, (b) a container base sidewall extending outwardly and upwardly from the central area having: (1) a container base sealing area with an annular sealing surface formed in the container base sidewall, and (2) a container base stop ridge adjacent the container base sealing area, and (c) an outwardly extending convex rim adjoining the container base stop ridge having an outer lip formed thereabout; and (ii) a resilient mating domed lid having (a) a raised central portion, (b) a downwardly extending resilient lid sidewall adjoining the raised central portion, (c) a flexible surround adjoining and extending outwardly about the downwardly extending resilient lid sidewall, (d) an outwardly extending flange adjoining the surround having (1) a lid sealing area with an annular sealing surface formed therein for engaging the container base sealing area formed in the container base sidewall, (2) a lid stop ridge formed in the flange adjacent the lid sealing area wherein the downwardly extending resilient lid sidewall, flexible surround and the outwardly extending flange are configured to urge the annular lid sealing area into contact area engagement with the annular container base sealing area while the lid stop ridge and container base stop ridge are configured to retain the annular lid sealing surface and annular container base sealing surface in area engagement with each other.

The containers of the invention may be constructed so that one or more container bases are configured to receive a common lid. There is thus provided in still yet another aspect of the present invention a sealable food container ensemble with common lidding including: (a) a sealing lid provided with a dome portion and a flexible lid sidewall extending downwardly from the dome portion as well as a lid flange portion extending outwardly with respect to the downwardly extending lid sidewall; (i) the lid flange portion defining a lid sealing area with an annular sealing surface extending upwardly with respect to the downwardly extending lid sidewall; (ii) the lid flange portion further defining a lid stop ridge; as well as (b) a plurality of container bases such as one or more bowls, plates or platters, each of which bases includes a substantially planar container base central portion, a container base sidewall extending generally upwardly and outwardly therefrom and a container base outer flange portion extending outwardly from the sidewall;

(i) each of the container base sidewalls defining a container base sealing area with an annular sealing surface disposed between its substantially planar container base central portion at a container base interior height intermediate the substantially planar container base central portion and the container base outer flange portion; (ii) each of the container base sidewalls further defining a container base stop ridge; wherein each of the plurality of container bases and the sealing lid are configured such that when the sealing lid is forced downwardly on one of the container bases, the annular sealing surface of the sealing lid is urged into surface-to-surface contact with the annular sealing surface of the container base and secured by cooperation of the lid stop ridge and the container base stop ridge; the food container ensemble including at least a first container base with a first container interior height and at least a second container base with a second container interior height which differs substantially from the first container interior height. Still further aspects and advantages of the present invention will become apparent from the discussion which follows.

BRIEF DESCRIPTION OF DRAWINGS

The invention is described in detail below with reference to the accompanying drawings wherein like numerals designate similar parts and wherein:

FIG. 1A is a sectional diagram of the rim components of a prior art sealing food container;

In the various drawings like numerals designate similar or identical parts.

DETAILED DESCRIPTION

Figure 1:
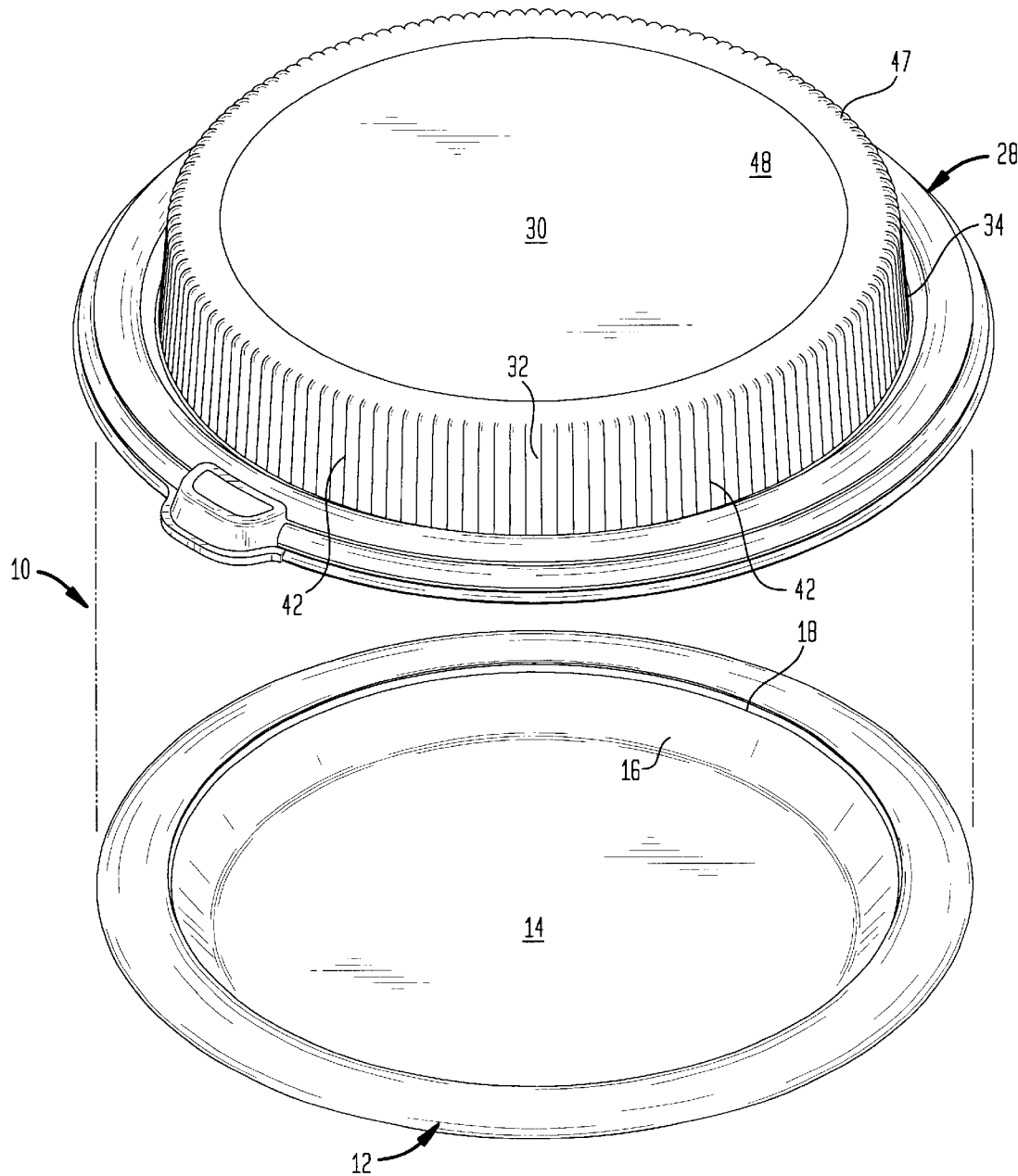
FIG. 1 is an exploded view in perspective showing a serving plate and sealing cover produced in accordance with the present invention.

The present invention is described in detail below for purposes of exemplification and illustration, only. Modification of specific embodiments or variations thereof within the spirit and scope of the appended claims will be readily apparent to those of skill in the art. In general, the present invention is directed to a disposable serving article such as a platter or a plate having a sidewall extending upwardly and outwardly from its central portion and a sealing cover with a sealing surface configured to engage the sidewall in sealing contact. The seal is substantially liquid-proof, whereas the materials forming the plate or platter and the sealing cover are resilient and flexible. These materials are also preferably selected so as to be suitable for heating or re-heating the contained food, for example, by way of a conventional or microwave oven or by heat lamps and so forth.

A particularly preferred material for the plate or platter is mica-filled polypropylene, optionally provided with calcium carbonate, polyethylene and titanium dioxide in suitable amounts as hereinafter described. The sealing lid or cover may be opaque or transparent and is most preferably made of a styrene polymer composition. Typically, the lid is oriented or rubberized to give it sufficient rigidity and flexibility to provide a good seal. As will be appreciated by one of skill in the art, suitable polymeric materials for the disposable plate and cover are readily available. Mineral filled polypropylene, especially mica filled polypropylene is, for example, suitable as noted above. Other suitable flexible and resilient materials include other polyolefins such as polyethylenes, polystyrenes, polypropylenes and mixtures thereof, polyesters, polyamides, polyacrylates, polysulfones, polyetherketones, polycarbonates, acrylics, polyphenylene sulfides, acetals, cellulosics, polyetherimides, polyphenylene ethers/oxides, styrene maleic anhydride copolymers, styrene acrylonitrile copolymers, polyvinylchlorides, and engineered resin derivatives thereof. These materials may be filled or unfilled, solid (continuous) or foamed.

The containers of the invention may be made by any suitable technique, that is, techniques employed for forming plastics. The products may thus be made from thermoplastic sheet formed, themoformed, thermoformed by the application of vacuum or thermoformed by a combination of vacuum and pressure into the products of the invention. Alternatively, the inventive containers may be made from a plastic material by injection molding, injection blow molding, compression molding, injection stretch molding, composite injection molding and so forth. Thermoforming from plastic sheet is particularly preferred.

In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming,* published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap.

Turning to FIGS. 1 through 6, there is shown a serving plate/sealing lid combination in accordance with the present invention. The inventive food container 10 includes a circular serving plate 12 provided with a central, substantially planar portion 14 provided with a sidewall 16 extending outwardly and upwardly from planar portion 14. Most preferably, sidewall 16 defines a sealing area, preferably a frustal tapered sealing area 18 extending about the sidewall as a recess wherein a frustal surface 17 also extends upwardly and outwardly, as can most clearly be seen in FIG. 5. That is, surface 17 extends upwardly and outwardly with respect to the central portion of the plate shown in FIGS. 1 and 3, for example. Sealing area 18 typically may be configured as a groove in the sidewall with its outer annular surface, such as frustal shaped surface 17, forming the base sealing surface. The groove is in the sidewall between the base and outer flange.

Adjacent area 18, a primary stop ridge 20 is defined at the uppermost extremity of the sidewall, whereas a guide ridge 22 is defined adjacent an outwardly extending shelf 23 which transitions to surface 17 and sidewall 16. Extending outwardly with respect to ridge 20 is a convex rim 24, with an outer lip 26. Ridge 20 may also be thought of as an inner surface of an undercut groove defined in the sidewall, as will be apparent from the Figures.

A sealing cover 28 forms the second part of food container 10. Cover 28 has a central dome portion 30 as well as a downwardly extending sidewall 32 which extends to a flexible surround 34 which projects outwardly with respect to downwardly projecting sidewall 32. Throughout this specification and claims, the term "dome" and its derivatives are used in the broad sense of a vault, ceiling, cover or roof having an inner surface which is generally concave regardless of whether the inner surface is hemispherical, polyhedral or another compound shape. An outwardly projecting frustal sealing surface 36 of lid 28 extends upwardly and outwardly with respect to the sidewall and central portion 14 of plate 12 when the lid engages the plate, such that surface 36 mates with frustal sealing surface 17 of plate 12 to provide a liquid-proof seal wherein surface 17 and surface 36 are in surface-to-surface contact about the entire periphery of the container. Surface 36 is shown as an annularly extending tapered frustal surface; however surface 36 may be of any suitable shape, preferably a shape which corresponds closely to surface 17 of sealing area 18 of serving plate 12.

A lid stop ridge 38 is provided adjacent sealing surface 36 so that the lid is retained by ridge 20 of plate 12, whereas the surround is positioned by guide ridge 22 and shelf 23.

The downwardly extending resilient lid sidewall 32 of cover 28, flexible surround 34 and the outwardly extending flange portion 49 are configured to urge frustal sealing surface 36 into area contact engagement with frustal sealing area 18 of plate 12, when the container is pressed together as shown in FIGS. 2–6. Stop ridge 38 of sealing cover 28 cooperates with stop ridge 20 of plate 12 to hold the cover in place whereas surround 34 is positioned by way of guide ridge 22 and shelf 23.

A plurality of ridges 42 in sidewall 32 of sealing cover 28 may be fluted as shown and extend from an apex 47 to flexible surround 34. These ridges 42 provide stiffness to the resilient lid to effect a secure seal with the base.

As noted above, ridges 42 in cover 28 optionally provide stiffness to force the contact areas into engagement, whereas outer upwardly convex rim 24 provides stiffness to the plate. A generally U-shaped outer flange 44 of cover 28 (as shown) provides extra sealing and helps retain the lid on the plate during the sealing process. In some applications, a ridge 29 forming an undercut around the periphery may be either discontinuously disposed around the periphery or omitted altogether.

Container 10 is sealed by placing plate 12 on a flat rigid surface and placing cover 28 over the plate. The lid is then forced downwardly such that resilient sidewall 32 flexes inwardly while surround 34 deforms slightly to allow frustal surface 36 to be forced past stop ridge 20 of plate 12 and into engagement with sealing area 18 of the plate. Once the lid 28 and the plate are thus forced into engagement, stop ridge 20 of plate 12 and stop ridge 38 of cover 28 hold sealing area 18 and sealing surface 36 in contact engagement. Oftentimes the seal is formed over one circumferential arc followed by sealing over the remainder of the circumference of the container as the lid is forced downwardly past ridge 20.

Figure 2:
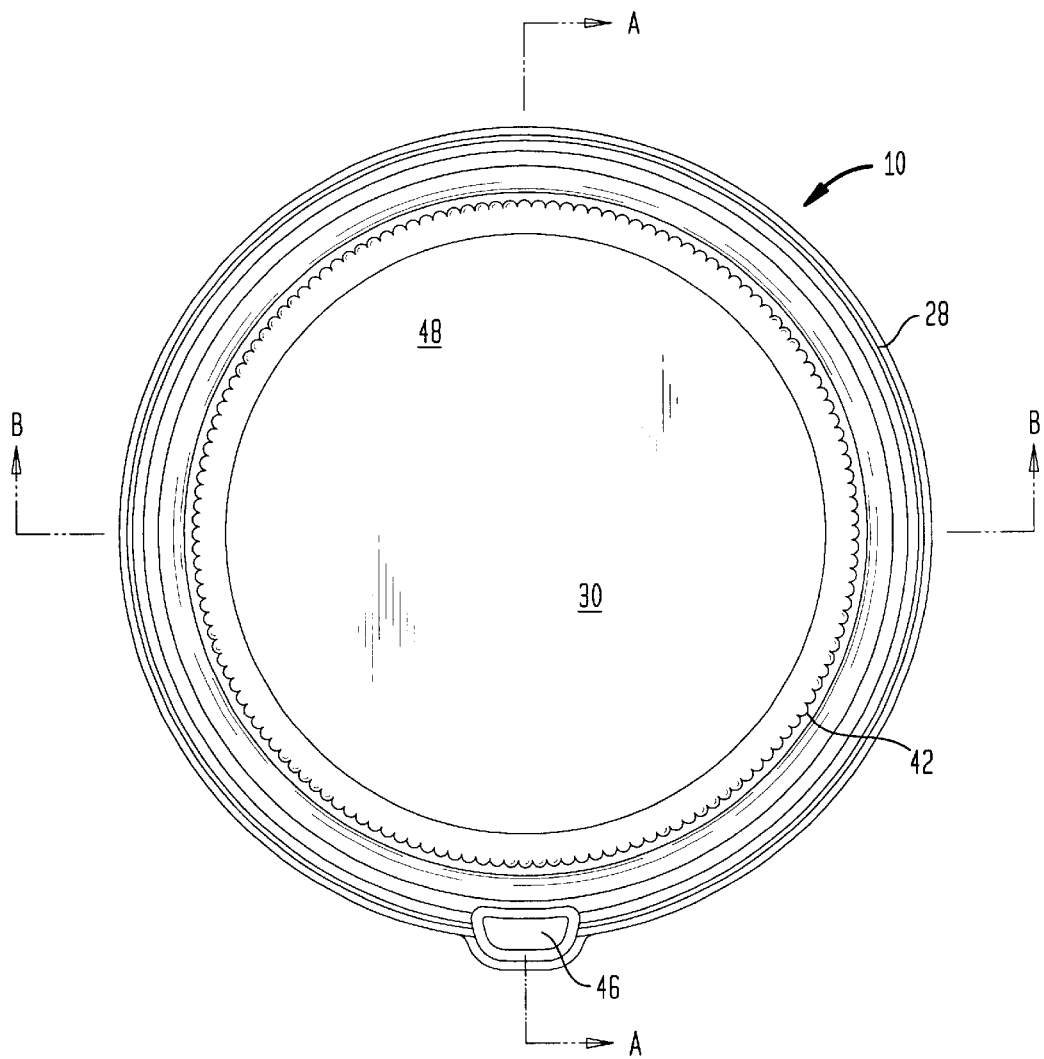
FIG. 2 is a top plan view showing one embodiment of a lid secured to a serving plate in accordance with the present invention;.
Figure 3:
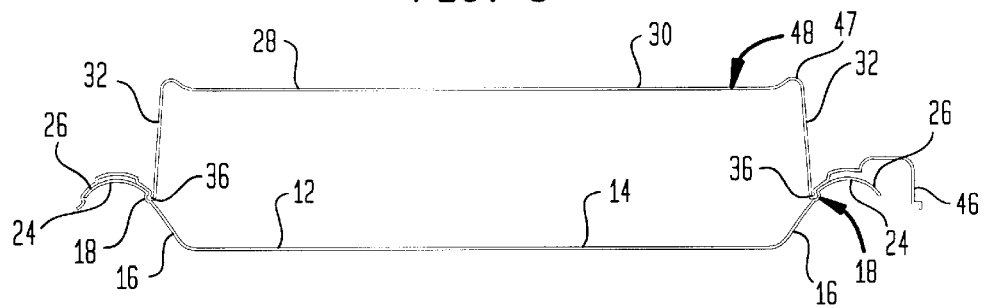
FIG. 3 is a sectional view in elevation of the lid and serving plate of FIG. 2 along line A—A.
Figure 4:
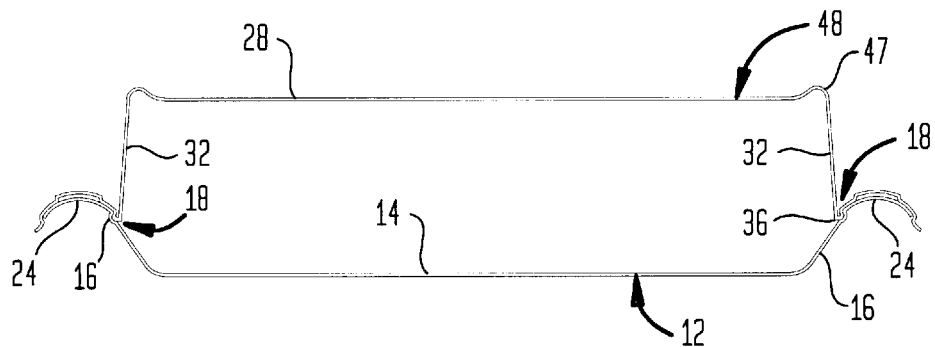
FIG. 4 is a sectional view in elevation of the lid and serving plate of FIG. 2 along line B—B.
Figure 5:
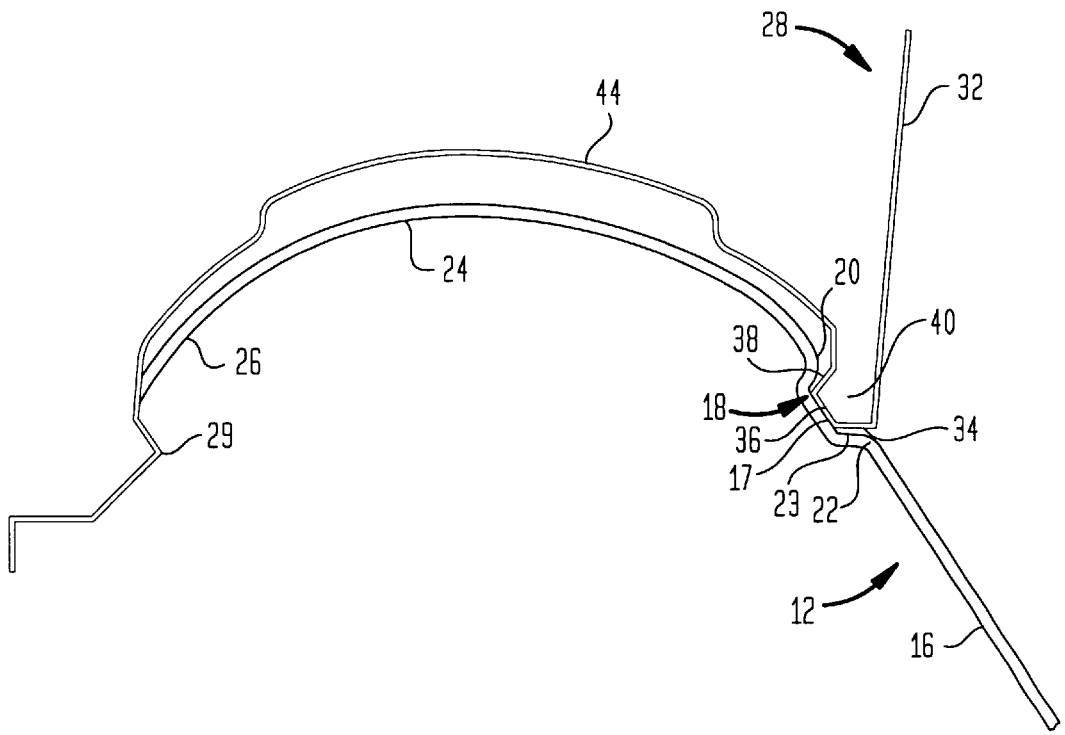
FIG. 5 is a sectional detail showing a cover engaged to the sidewall of a serving plate in accordance with the present invention.
Figure 6:
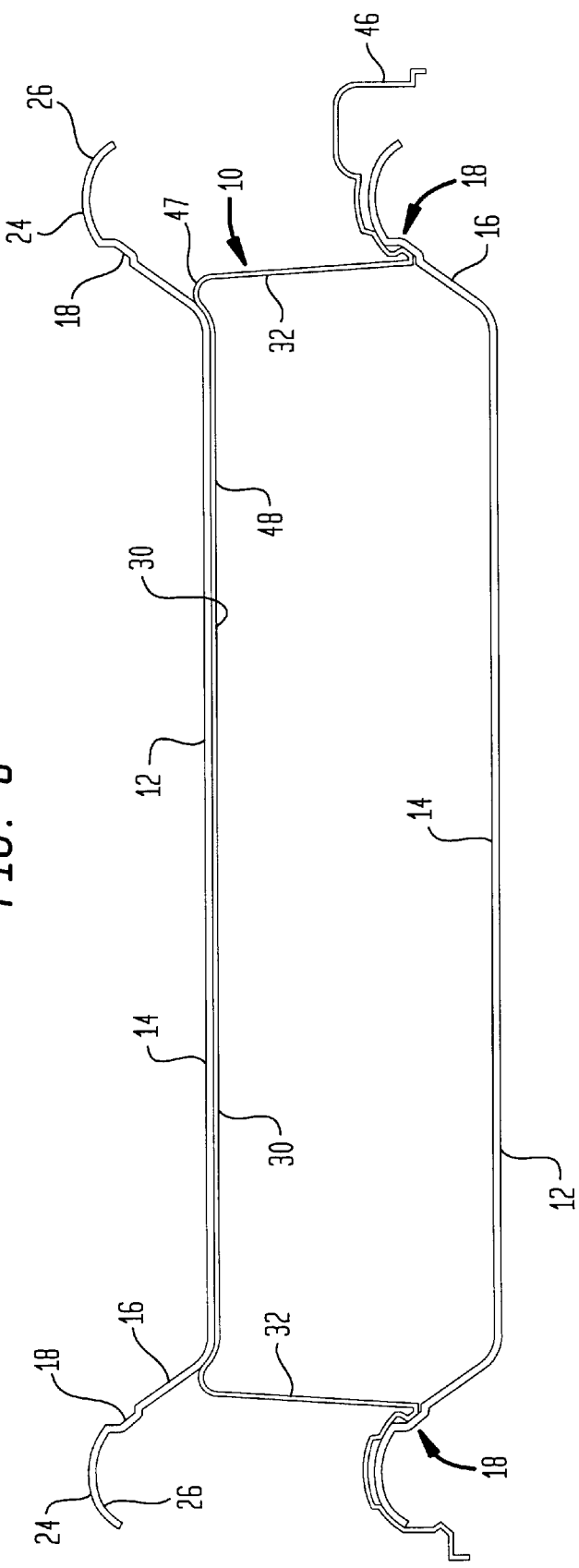
FIG. 6 is a sectional view in elevation showing an uncovered plate stacked upon the lid of a sealed plate.

An apex 47 of the lid is preferably dimensioned and arranged about the transition from dome 30 to sidewall 32 such that a raised portion defines a cavity 48 so that a plurality of containers 10 can be stacked. This to say, the cavity defined by the apex 47 correspond to central portion 14 of plate 12 to that containers 10 can be securely stacked as shown in FIG. 6. There is further optionally provided a tab 46 at an outer edge of the sealing cover to provide for easy removal of the cover as can be seen in FIGS. 2 and 3.

The platter or plate of the food container of the present invention may be produced utilizing polymeric compositions filled with conventional inorganic fillers such as talc, mica, wollastonite and the like, wherein the polymer component is, for example, a polyester, a polystyrene homopolymer or copolymer, a polyolefin or one or more of the polymers noted above. While any suitable polymer may be used, polypropylene polymers which are suitable for the plate or platter are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In some preferred embodiments, the melt-compounded composition from which the articles are made may include polypropylene and optionally further includes a polyethylene component and titanium dioxide. A polyethylene polymer or component may be any suitable polyethylene such as HDPE, LDPE, MDPE, LLDPE or mixtures thereof and may be melt-blended with polypropylene if so desired.

The various polyethylene polymers referred to herein are described at length in the *Encyclopedia of Polymer Science & Engineering* (2d Ed.), Vol. 6; pp: 383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

Typically, in filled plastics useful for making the plate or container base of the food container the primary mineral filler is mica, talc, kaolin, bentonite, wollastonite, milled glass fiber, glass beads (solid or hollow), silica, or silicon carbide whiskers or mixtures thereof. We have discovered that polypropylene may be melt-compounded with acidic-type minerals such as mica, as well as inorganic materials and/or basic materials such as calcium carbonate, talc, barium sulfate, calcium sulfate, magnesium sulfate, clays, glass, dolomite, alumina, ceramics, calcium carbide, silica, pigments such as titanium dioxide based pigments and so on. Many of these materials are enumerated in the *Encyclopedia of Materials Science and Engineering,* Vol. # 3, pp. 1745–1759, MIT Press, Carmbridge, Mass. (1986), the disclosure of which is incorporated herein by reference. Combinations of fillers are preferred in some embodiments.

Mineral fillers are sometimes referred to by their chemical names. Kaolins, for example, are hydrous alumino silicates, while feldspar is an anhydrous alkalialumino silicate. Bentonite is usually an aluminum silicate clay and talc is hydrated magnesium silicate. Glass, or fillers based on silicon dioxide may be natural or synthetic silicas. Wollastonite is a calcium metasilicate whereas mica is a potassium alumino silicate. Clays may be employed as a primary filler; the two most common of which are kaolin and bentonite. Kaolin refers generally to minerals including kaolinite which is a hydrated aluminum silicate ($Al_2O_3.2SiO_2.2H_2O$) and is the major clay mineral component in the rock kaolin. Kaolin is also a group name for the minerals kaolinite, macrite, dickite and halloysite. Bentonite refers to hydrated sodium, calcium, iron, magnesium, and aluminum silicates known as montmorillonites which are also sometimes referred to as smectites.

A large number of siliceous materials may also be employed as a primary filler. These materials include diatomite, perlite, pumice, pyrophillite, silica, and talc. These minerals typically consist of an alkali metal oxide or alkaline earth element oxide, and silicon dioxide together with a minor amount of water and other elements. Talc, for example, includes from about 25% to about 35% MgO, 35–60% $SiO_2$ and about 5% $H_2O$.

Diatomite or kieselguhr is a sedimentary material formed by centuries of life cycles of aquatic diatoms, a simple plant in the algae family with an opaline silica cell wall. Thousands of species of diatoms have flourished and continue to do so in both marine and lacustrine environments. Fossilized skeletal remains of diatoms in commercial quantities are found in many parts of the world. Perlite is believed to result from hydration of volcanic glass or obsidian. Generally, hydration is about 2–5%; this water content is important to the expansibility of the perlite, influencing melting point and supplying expansion steam.

The rapid expansion of dissolved gases in silica lavas during volcanic eruptions produces the light density pumice or pumicite. The finer pumicite particles are transported by wind away from the source volcano, whereas pumice accumulates closer to the vent.

The hydrous aluminum silicate, pyrophilite, is formed by hydrothermal metamorphism of acid tuffs or braccias.

Silica sand is frequently obtained from the weathering of quartz-containing rock. Decomposition and disintegration of the rock with decomposition of other minerals leaves a primary quartz sand that has been concentrated by water movement. Induration of sands to sandstone results in another source for silica sand. Amorphous silica, or more properly cryptocrystalline or microcrystalline silica, is formed by the slow leaching of siliceous limestone or calcareous chert.

Talc is formed by the metamorphic (hydrothermal) alteration of magnesium silicates such as serpentine, pyroxene or dolomite.

The siliceous fillers are generally inert in most applications as shown by pH values in the range from about 6–10.

Sulfate minerals, such as gypsum and barite may likewise be employed as a primary filler. Gypsum is the name given to the mineral that consists of hydrous calcium sulfate ($CaSO_4.2H_2O$), and also to the sedimentary rock that consists primarily of this mineral in its pure state, gypsum contains 32.6% lime (CaO), 46.5% sulfur trioxide ($SO_3$), and 20.9% water. Single crystals and rock masses that approach this theoretical purity are generally colorless to white, but in practice, the presence of impurities such as clay, dolomite, silica and iron imparts a gray brown, red or pink color to the rock.

There are three common varieties of gypsum: selenite, which occurs as transparent or translucent crystals or plates; satin spar, which occurs as thin veins (typically white) of fibrous gypsum crystals; and alabaster, which is compact, fine-grained gypsum that has a smooth, even-textured appearance. Most deposits of rock gypsum that are suitable for industrial purposes are aggregates of fine to coarse gypsum crystals that have intergrown to produce a thick, massive sedimentary rock unit that is 90–98% gypsum. Alabaster is highly prized because of its uniformly fine particle size, but the more common deposits of rock gypsum consisting of coarser-grained selenite can generally be crushed and ground to produce a suitable filler and coating material.

Gypsum has a hardness of 2 on the Mohs scale, and can be scratched with the fingernail. Large rock masses are easily crushed and ground to a fine powder. The specific gravity of gypsum is about 2.31 and the refractive index is about 1.53. Gypsum is slightly soluble in water but it is an inert substance that resists chemical change. The oil-absorption capacity of gypsum is fairly low (0.17–0.25 $cm^3$ $g^{-1}$).

Raw or crude gypsum is one of the forms used as fillers and coatings, but for some purposes calcined or deadburned gypsum is desired. In calcining, the gypsum is heated to abut 120–160° C. to drive off free water and partially remove the water of crystallization. The calcined material or stucco, has a chemical composition of $CaSO_4.\frac{1}{2}H_2O$, and it readily takes up water. Calcination at higher temperatures (500–725° C.) results in a product called deadburned gypsum, which has a composition of $CaSO_4$.

Anhydrite, a sulfate mineral and rock that is closely associated with gypsum in nature and has minor uses as a filler, is anhydrous calcium sulfate ($CaSO_4$) containing 41.2% CsO and 58.8% $SO_3$. It is typically fine grained (like alabaster), and occurs in thick, massive sedimentary rock units. Anhydrite usually is white or bluish gray when pure, but it may be discolored by impurities. Anhydrite has a hardness of 3.5, a specific gravity of 2.98, and a refractive index of 1.57–1.61.

Thus, fillers commonly include:

Barium Salt

Barium Ferrite

Barium Sulfate

Carbon/Coke Powder

Calcium Fluoride
Calcium Sulfate
Carbon Black
Calcium Carbonate
Ceramic Powder
Chopped Glass
Clay
Continuous Glass
Glass Bead
Glass Fiber
Glass Fabric
Glass Flake
Glass Mat
Graphite Powder
Glass Sphere
Glass Tape
Milled Glass
Mica
Molybdenum Disulfide
Silica
Short Glass
Talc
Whisker
Particulate fillers, besides mica, commonly include:
Glass
Calcium carbonate
Alumina
Beryllium oxide
Magnesium carbonate
Titanium dioxide
Zinc oxide
Zirconia
Hydrated alumina
Antimony oxide
Silica
Silicates
Barium ferrite
Barium sulphate
Molybdenum disulphide
Silicon carbide
Potassium titanate
Clays
Whereas fibrous fillers are commonly:
Whiskers
Glass
Mineral wool
Calcium sulphate
Potassium titanate
Boron
Alumina
Sodium aluminum
Hydroxy carbonate Suitably the extruded polymeric compositions may include coloring agents for aesthetic appeal, preferably titanium dioxide, carbon black, and other opacifying agents in the range of 0.5–8 weight percent based on total composition, preferably 1.5 to 6.5 weight percent. The compositions may comprise minor amounts of other additives such as lubricants and antioxidants. These articles of manufacture may be suitably colored with pigments or dyes. Pigments are defined as small insoluble organic or inorganic particles dispersed in the resin medium to promote opacity or translucency. Usual pigments include carbon black, titanium dioxide, zinc oxide, iron oxides, and mixed metal oxides. Dyes are organic and soluble in the plastic, and may be used alone or in combination with pigments to brighten up pigment based colors. All such colorants may be used in a variety of modes which include dry color, conventional color concentrates, liquid color and precolored resin. One particularly preferred way of making a black polypropylene product is to use a black color concentrate with the following formulation:

50% Black Iron Oxide (318 M)
7.14% $TiO_2$ (Chronos 2073)
3.55% Phthaiocyanine Green (264-8142, Sun Chemical)
39.31% Polypropylene Resin The concentrate is melt-blended with a suitable polypropylene resin during extrusion.

As noted above, a mica-filled polypropylene polymer composition is particularly preferred for forming the base or plate portion of the container.

The dome portion of the present invention is preferably formed from an oriented or rubberized polystyrene composition. The lid or dome may be thermoformed from biaxially oriented polystyrene sheet (OPS) or can include polystyrene and a blended rubber component or may be a styrene/rubber copolymer such as K resin. K resin is a copolymer of styrene and butadiene and is available from Phillips Petroleum, Bartlesville, Okla. Preferred grades included from about 2 to about 40 wt. % butadiene. Alternatively or in addition to diene comonomer, the styrene compositions may contain one or more of the rubbery polymers discussed below.

So-called core-shell polymers built up from a rubber-like core on which one or more shells have been grafted may be used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as rubbery modifiers in the present compositions. An example of an olefin acrylate copolymer modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers as such can also be employed as modifiers. Examples of such rubbery polymers are polybutadiene, polyisoprene, and various other polymers or copolymers having a rubbery dienic monomer.

Styrene-containing rubbery polymers are also suitable modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers in some embodiments.

As can be seen from the foregoing description and accompanying drawings, a preferred embodiment is wherein the base stop ridge is located at the outer periphery of the frustal sealing area of the sidewall and the lid stop ridge is located at the outer periphery of the frustral sealing area of the sealing lid and wherein the sealing lid is dimensioned so as to outwardly flexibly urge the frustal sealing area of the lid into surface-to-surface contact with the frustal sealing area of the base serving member when the base serving member and the sealing lid are engaged. The frustal sealing area of the base serving member and the stop ridge of the base member are typically formed as a recessed portion of the sidewall of the base serving member, such that the recessed portion of the sidewall of the base member further includes a guide shoulder.

The article made according to the present invention may have any particular size as desired by the user so long as the relative base and lid features are present. More specifically, square or rectangular with rounded corners, triangular, oval, multi-sided, polyhedral, and similar shapes may be made having the profile described above including plates, bowls, platters, and common lidding features such as 6 1/16-inch and 12 oz., 7 5/16-inch and 20 oz. plates and bowls. In various embodiments of the present invention the container may be 6 1/16-inch, 7 5/16-inch, 9-inch, 10 1/4-inch and 11-inch plates; 10 1/4-inch and 11-inch compartmented plates; 12 oz., 20 oz. or 34 oz. fluid capacity bowls. A compartmented plate may be generally configured as shown in FIGS. 7 and 8.

Figure 7:
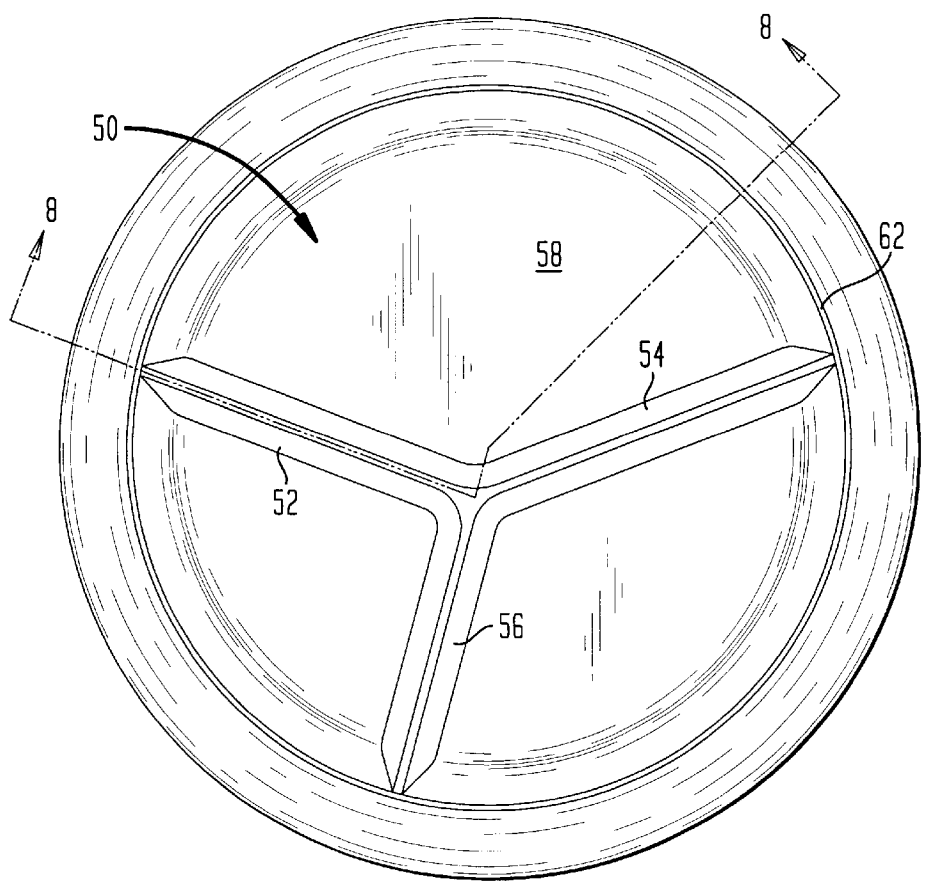
FIG. 7 is a plan view of a compartmented plate having 3 compartments and a sidewall groove for receiving a lid in accordance with the present invention.
Figure 8:
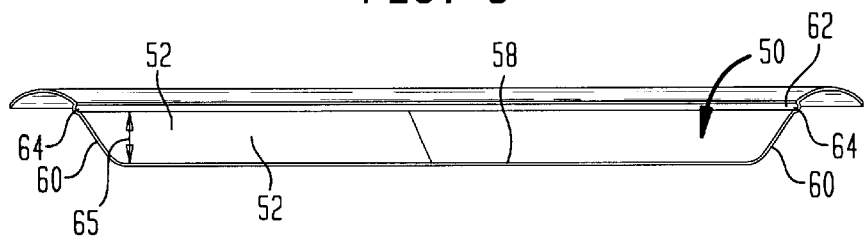
FIG. 8 is a sectional view along line 8—8 of FIG. 7 showing the relative positions of the sidewall groove and dividers.

There is shown in FIGS. 7 and 8 a compartmented plate 50 having first, second and third dividing ribs 52, 54 and 56 extending outwardly from the center of the plate and projecting upwardly from a substantially planar portion 58 of the plate. The ribs extend outwardly to a sidewall 60 which is provided with a frustal sealing area 62 substantially identical to frustal sealing area 18 of FIGS. 1–5 described in detail above. The ribs intersect sidewall 60 at a height 65 from planar portion 58 equal to or lower than the lowermost portion 64 of sealing area 62, so as not to interfere with the operation of a corresponding lid.

Figure 9:
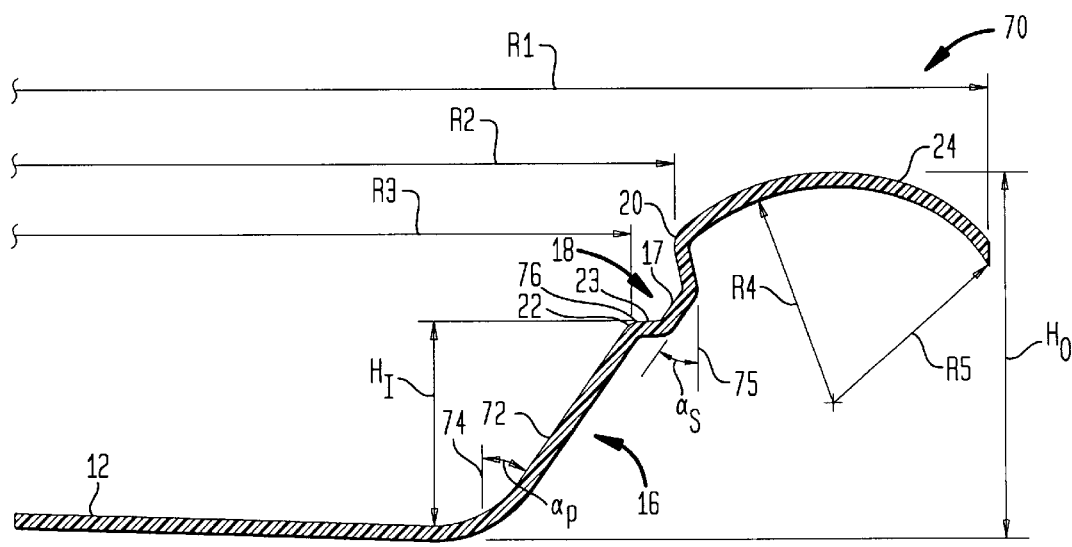
FIG. 9 is a schematic diagram illustrating the profile from center of a disposable plate which may be utilized in connection with the present invention.
Figure 10:
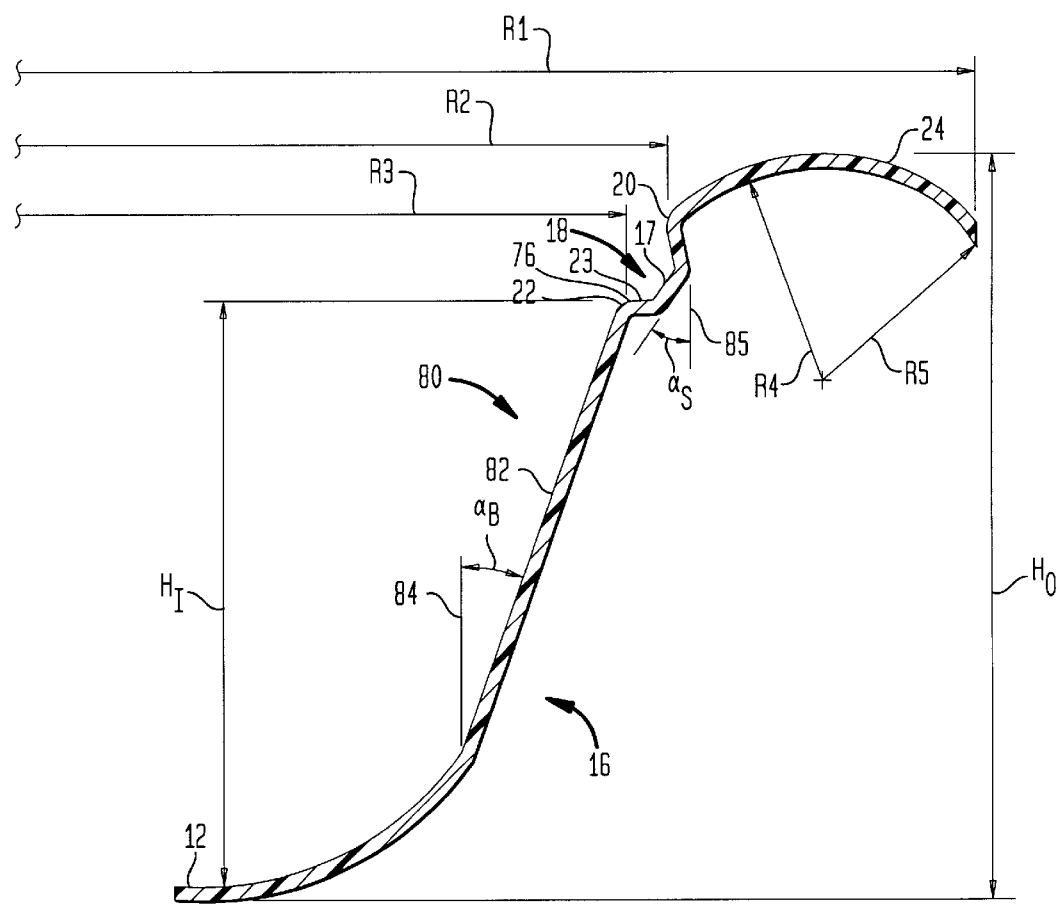
FIG. 10 is a schematic diagram illustrating the profile from center of a disposable bowl which may be utilized in connection with the present invention.
Figure 11A:
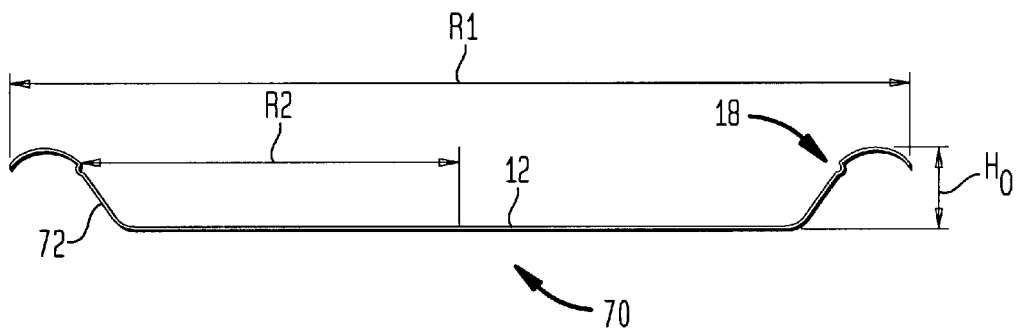
FIG. 11 is an overlaid schematic diagram of the bowl and plate of FIGS. 9 and 10 illustrating the relative dimensions and shapes.
Figure 11B:
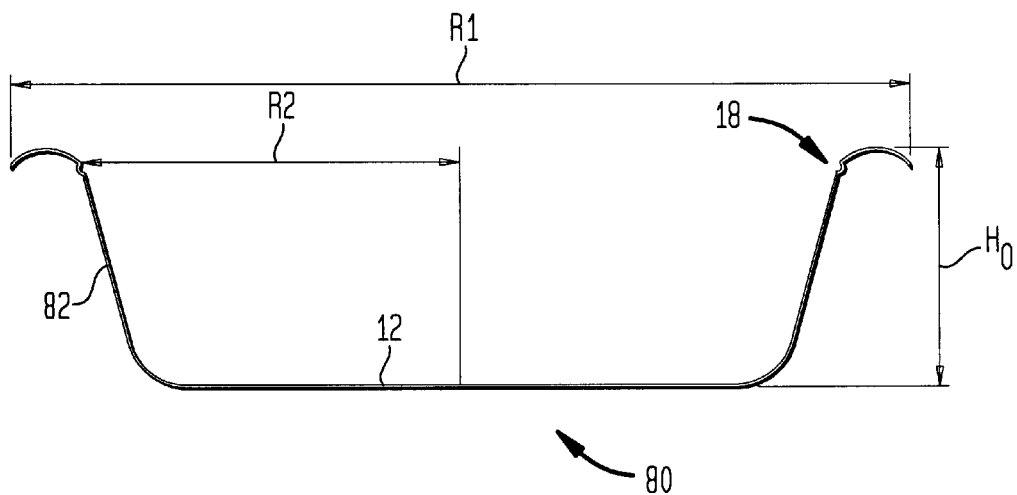
Figure 11C:
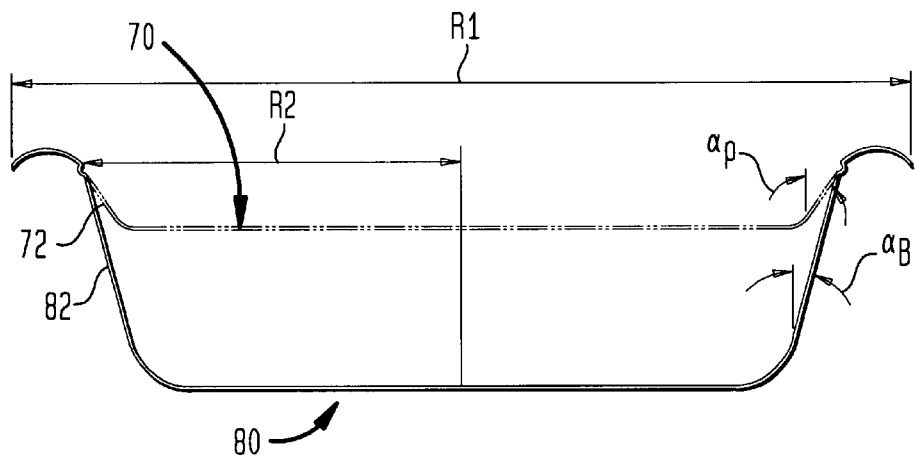

So also, containers of the present invention may utilize a common lid for a plurality of container bases as can be appreciated from FIGS. 9 through 11. FIG. 9 is a schematic diagram showing the profile of a circular plate 70 having a substantially planar central portion 12 which may have a slight crown if so desired, which transitions to a sidewall 16 provided with a sealing area 18 with a stop ridge 20, a guide ridge 22, a horizontally extending shelf 23 and an upwardly convex rim 24.

Sealing area 18 includes an annular sealing surface 17 which may be a frustal tapered surface as noted above. Sealing area 18 is located at a height in the sidewall which approximates for practical purposes the container base interior height, $H_I$, at or about the lowermost portion of the sealing area.

Sidewall 16 has an inclined lower portion 72 extending from planar portion 12 to sealing area 18 generally at a lower sidewall angle, $\alpha_p$ with respect to a vertical 74 from the planar portion 12 of the plate. The plate has an overall height, $H_o$, as well as an overall radius from center, R1. A radius from center to stop ridge 20 is shown as R2, while a radius from center, R3, extends to inner edge 76 of shelf 23. Upwardly convex rim 24 may have an inner radius of curvature, R4, which is typically larger than an outer radius of curvature, R5. Surface 17 of sealing area 18 defines a characteristic frustal angle, $=_s$, with respect to a vertical 75 from substantially planar portion 12 of the plate.

While any suitably dimensioned plate may be utilized in accordance with the present invention, typical dimensions and angles for circular plates having the profile of FIG. 9 are given in Table 1.

TABLE 1

Typical Plate Dimensions (Inches and Degrees)

| Product | $H_0$ | $H_1$ | R1 | R2 | R3 | R4 | R5 | $\alpha_p$ | $\alpha_s$ |
|---|---|---|---|---|---|---|---|---|---|
| 6 1/16" plate | 0.52 | 0.31 | 3.03 | 2.53 | 2.46 | 0.41 | 0.28 | 35 | 35 |
| 7 5/16" plate | 0.62 | 0.40 | 3.66 | 3.06 | 2.99 | 0.49 | 0.33 | 35 | 35 |
| 9" plate | 0.77 | 0.51 | 4.5 | 3.77 | 3.70 | 0.60 | 0.41 | 35 | 35 |
| 10 1/4" plate | 0.87 | 0.60 | 5.12 | 4.30 | 4.22 | 0.68 | 0.47 | 35 | 35 |

FIG. 10 is a schematic diagram showing the profile of a circular bowl 80 having a substantially planar central portion 12 which may have a slight crown if so desired, which transitions to a sidewall 16 provided with a sealing area 18 with a stop ridge 20, a guide ridge 22, a horizontally extending shelf 23 and an upwardly convex rim 24.

Sealing area 18 includes an annular sealing surface 17 which may be a frustal tapered surface as noted above. Sealing area 18 is located at a height in the sidewall which approximates for practical purposes the container base interior height, $H_I$, at or about the lowermost portion of the sealing area.

Sidewall 16 has an inclined lower portion 82 extending from planar portion 12 to sealing area 18 generally at a lower sidewall angle, $\alpha_B$ with respect to a vertical 84 from the planar portion 12 of the bowl. The bowl has an overall height, $H_o$, as well as an overall radius from center, R1. A radius from center to ridge stop 20 is shown as R2, while a radius from center, R3, extends to inner edge 76 of shelf 23. Upwardly convex rim 24 may have an inner radius of curvature, R4, which is typically larger than an outer radius of curvature, R5. Surface 17 of sealing area 18 defines a characteristic frustal angle, $\alpha_S$, with respect to a vertical 85 from substantially planar portion 12 of the bowl.

While any suitably dimensioned bowl may be utilized in accordance with the present invention, typical dimensions and angles for circular bowls having the profile of FIG. 10 are given in Table 2.

TABLE 2

Typical Bowl Dimensions (Inches and Degrees)

| Product | $H_0$ | $H_1$ | R1 | R2 | R3 | R4 | R5 | $\alpha_\beta$ | $\alpha_s$ |
|---|---|---|---|---|---|---|---|---|---|
| 12 oz. bowl | 1.74 | 1.53 | 3.03 | 2.53 | 2.46 | 0.41 | 0.28 | 20 | 35 |
| 20 oz. bowl | 1.87 | 1.64 | 3.66 | 3.06 | 2.99 | 0.49 | 0.33 | 20 | 35 |

FIG. 11 illustrates the construction of a plate 70 and bowl 80 suitably configured to receive a common lid. The dimensions may be those of 6 1/16" and a 12 oz. bowl or a 7 5/16" plate and 20 oz. bowl given in Tables 1 and 2 above, for example. Important differences in the profile of these articles is that of the interior and overall heights and lower sidewall angles. The bowl may define a lower sidewall angle, $\alpha_B$, with respect to a vertical from the bottom of 20 degrees or so; typically anywhere from about 10 degrees to about 25 degrees; whereas the plate may define a lower sidewall angle, $\alpha_p$, with respect to a vertical from the bottom of 35 degrees or so; typically anywhere from about 30 to about 50 degrees. As can be seen in the FIGS. and from the above data, both the bowl and the plate typically have frustal sealing surfaces which define the same characteristic frustal angle, as, with respect to a vertical from their respective substantially planar container base central portions. That angle is typically from about 30 to about 50 degrees and is about 35 degrees in the embodiments shown. The ratio of the overall height of the bowl to the overall height of the plate may be from about 2.5 to about 4.0. FIG. 11A is a schematic profile of a circular plate 70; whereas FIG. 11B is the schematic profile of a bowl 80 designed for common liddage with plate 70. FIG. tic compares the two profiles, with the profile of plate 70 shown in dashed lines not common with the profile of bowl 80. As will be appreciated from FIG. 11, bowl 80 and plate 70 have substantially identical outer profiles extending outwardly from the stop ridges adjacent to their respective sealing areas and have equal radii from their centers to their stop ridges as well as equal sealing area frustal angles, $\alpha_S$. The bowl and plate may have a horizontal shelf, such as shelf 23 and have an identical profile extending from the inner edges of their shelf portions to their outermost peripheries, as shown. The bowl typically has an overall height of more than twice that of the corresponding plate. In a preferred embodiment, the outer flanges of the bowl and plate are upwardly convex and have an inner radius of curvature which is greater than an outer radius of curvature.

In one preferred embodiment, the outer flange of the base serving member is an arcuate outer flange, and the base serving member is thermoformed from a mineral-filled polypropylene sheet.

In some preferred embodiments, the base serving member (i.e., a plate or platter) has a wall thickness from about 10 to about 80 mils and consists essentially of from about 40 to about 90 percent by weight of a polypropylene polymer, from about 10 to about 60 percent by weight of a mineral filler, from about 1 to about 15 percent by weight polyethylene, from about 0.1 to about 5 weight percent titanium dioxide and optionally includes a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof. Calcium carbonate may be present in an amount of from about 5 to about 20 weight percent, whereas polyethylene may be present from about 2.5 to about 15 percent by weight, or from about 4 to about 5 weight percent. Titanium dioxide is generally present from about 0.1 to about 3 weight percent when used with from about 0.25 to about 2 percent by weight, being typical. Titanium dioxide is present in an amount of at least about 0.5 percent by weight in some preferred embodiments.

The plate or platter generally has a wall caliper of from about 10 to about 50 mils, whereas a wall caliper of from about 15 to about 25 mils is somewhat typical. When mica is employed as the filler, it is usually used in amounts of from about 10 to 60 weight percent. Modifications to particular embodiments within the spirit and scope of the present invention, set forth in the appended claims, will be readily apparent to one of skill in the art.

What is claimed is:

1. A sealable food container comprising:
   (a) a base serving member having a substantially planar central portion, a sidewall extending generally upwardly and outwardly therefrom and a base outer flange portion extending outwardly from said sidewall;
      (i) said sidewall defining a sealing sidewall recess disposed between said substantially planar central portion of said base serving member and said base outer flange portion, the recess having an inwardly projecting base stop ridge at its upper edge, a shelf at its lower edge and between the base stop ridge and shelf an inwardly facing annular sealing surface at an outer wall of the sidewall recess;
   wherein the inwardly facing sealing surface of the sealing recess is a frustal sealing surface, extending upwardly and outwardly with respect to the substantially planar central portion of the base; and
   (b) a sealing lid provided with a dome portion and a flexible sidewall extending downwardly from said dome portion as well as a lid flange portion extending outwardly with respect to said downwardly extending sidewall;
      (i) said lid flange portion defining a sealing area with an annular sealing surface extending upwardly with respect to said downwardly extending sidewall of said sealing lid;
      (ii) said flange portion further defining a lid stop ridge;
   wherein said base serving member and said sealing lid are configured such that when said sealing lid is forced downwardly on said base serving member, said sealing surface of said sealing lid is urged into surface-to-surface contact with said frustal sealing surface of said base serving member by way of the inwardly disposed configuration of the lid with respect to the seal and the lid and base are secured by cooperation of said base stop ridge of said base serving member and said lid stop ridge of said sealing lid.

2. The food container according to claim 1, wherein said outer flange of said base serving member is an arcuate outer flange.

3. The food container according to claim 1, wherein said base serving member is fabricated from a thermoplastic material by way of a technique selected from the group consisting of injection molding, injection blow molding, injection stretch molding and composite injection molding.

4. The food container according to claim 1, wherein said base serving member is formed from a foamed polymeric material.

5. The food container according to claim 1, wherein said sealing lid is fabricated from a thermoplastic material by way of a technique selected from the group consisting of injection molding, injection blow molding, injection stretch molding and composite injection molding.

6. The food container according to claim 1, wherein said sealing lid is formed from a foamed polymeric material.

7. The food container according to claim 1, wherein said base serving member is thermoformed from a mineral-filled polypropylene sheet.

8. The food container according to claim 1, wherein said base serving member is formed from a polypropylene sheet and includes a colorant selected from the group consisting of: black iron oxide and phthalocyanine green.

9. The food container according to claim 1, wherein said sealing lid comprises a U-shaped outer flange.

10. The food container according to claim 1, wherein said annular sealing surface of said lid is a conically shaped frustal sealing surface extending upwardly and outwardly with respect to said downwardly extending sidewall of said sealing lid.

11. The food container according to claim 10, wherein the frustal sealing surface of said base serving member and said stop ridge of said base member define a recess extending outwardly of said sidewall of said base serving member.

12. The food container according to claim 11, wherein said recess extending outwardly of said sidewall of said base member has a substantially horizontal lower wall.

13. The food container according to claim 1, wherein said base serving member is formed from a sheet of thermoplastic material.

14. The food container according to claim 13, wherein said thermoplastic material is a foamed or solid polymeric material selected from the group consisting of: polyamides, polyacrylates, polysulfones, polyetherketones, polycarbonates, acrylics, polyphenylene sulfides, acetals, cellulosic polymers, polyetherimides, polyphenylene ethers or oxides, styrene-maleic anhydride copolymers, styrene-acrylonitrile copolymers, polyvinylchlorides and mixtures thereof.

15. The thermoplastic container of claim 13, wherein said thermoplastic material comprises a foamed or solid polymeric material selected from the group consisting of: polyesters, polystyrenes, polypropylenes, polyethylenes and mixtures thereof.

16. The food container according to claim 13, wherein said base serving member is thermoformed, thermoformed by the application of vacuum or thermoformed by a combination of vacuum and pressure.

17. The food container according to claim 16, wherein said base serving member is thermoformed by the application of vacuum.

18. The food container according to claim 1, wherein said sealing lid is formed from a sheet of thermoplastic material.

19. The thermoplastic container of claim 18, wherein said thermoplastic material of the sealing lid comprises a foamed or solid polymeric material selected from the group consisting of: polyesters, polystyrenes, polypropylenes, polyethylenes and mixtures thereof.

20. The food container according to claim 18, wherein said sealing lid is thermoformed, thermoformed by the application of vacuum or thermoformed by a combination of vacuum and pressure.

21. The food container according to claim 20, wherein said sealing lid is thermoformed by the application of vacuum.

22. The food container according to claim 21, wherein said thermoplastic material of the sealing lid is a foamed or solid polymeric material selected from the group consisting of: polyamides, polyacrylates, polysulfones, polyetherketones, polycarbonates, acrylics, polyphenylene sulfides, acetals, cellulosic polymers, polyetherimides, polyphenylene ethers or oxides, styrene-maleic anhydride copolymers, styrene-acrylonitrile copolymers, polyvinylchlorides and mixtures thereof.

23. The food container according to claim 1, wherein said base serving member has a wall thickness from about 10 to about 80 mils and consists essentially of from about 40 to about 90 percent by weight of a polypropylene polymer, from about 10 to about 60 percent by weight of a mineral filler, from about 1 to about 15 percent by weight polyethylene, up to about 5 weight percent titanium dioxide and optionally including a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

24. The food container according to claim 23, wherein titanium dioxide is present from about 0.1 to about 3 weight percent.

25. The food container according to claim 23, wherein titanium dioxide is present in an amount of at least about 0.5 percent by weight.

26. The food container according to claim 23, wherein said mineral filler is mica.

27. The food container according to claim 23, wherein said polyethylene is high density polyethylene.

28. The food container according to claim 23, wherein said polyethylene is linear low density polyethylene.

29. The food container according to claim 23, wherein said base serving member has a wall caliper of from about 10 to about 50 mils.

30. The food container according to claim 29, wherein said base serving member has a wall caliper of from about 15 to about 25 mils.

31. The food container according to claim 23, wherein said polypropylene polymer is isotactic polypropylene.

32. The food container according to claim 31, wherein said isotactic polypropylene has a melt index of from about 0.3 to about 4.

33. The food container according to claim 31, wherein said isotactic polypropylene has a melt flow index of about 1.5.

34. The food container according to claim 23, wherein said basic organic or inorganic compound comprises calcium carbonate and said calcium carbonate is present in an amount of from about 5 to about 20 weight percent.

35. The food container according to claim 34, wherein polyethylene is present from about 2.5 to about 15 percent by weight.

36. The food container according to claim 35, wherein polyethylene is present from about 4 to about 5 weight percent.

37. The food container according to claim 36, wherein titanium dioxide is present from about 0.25 to about 2 percent by weight.

38. The food container according to claim 1, wherein said sealing lid is formed of a styrene polymer composition.

39. The food container according to claim 38, wherein said styrene polymer composition comprises a styrene-butadiene copolymer.

40. The food container according to claim 38, wherein said styrene polymer composition comprises a rubber component.

41. The food container according to claim 38, wherein said sealing lid is formed of oriented polystyrene.

42. The food container according to claim 1, wherein said base serving member is a compartmented plate with a plurality of dividing ribs projecting upwardly from said central portion of said base serving member and extending from the central portion of the plate to said sidewall, said ribs intersecting said sidewall at a height equal to or lower than the lowermost portion of said sealing area of said sidewall.

43. The food container according to claim 42, wherein said compartmented plate is a three-compartment plate.

44. A food container comprising in combination:
(i) a container base having
  (a) a substantially planar central serving area,
  (b) a container base sidewall extending outwardly and upwardly from the central serving area to a base outer flange portion, the sidewall defining:
    (1) a sealing sidewall recess disposed between said substantially planar central serving area of said base serving member and said base outer flange portion, the recess having; an inwardly projecting base stop ridge at its upper edge; a shelf at its lower edge; and between the base stop ridge and shelf, an inwardly facing annular sealing surface at an outer wall of the sidewall recess; and
    (2) wherein the inwardly facing sealing surface of the sealing recess is a frustal sealing surface, extending upwardly and outwardly with respect to the substantially planar central serving area of the base; and
  (c) wherein the outer flange portion is an outwardly extending arcuate rim adjoining said container base stop ridge, the outwardly extending arcuate rim being upwardly convex away from the planar central serving area; and
(ii) a resilient mating domed lid having
  (a) a raised central portion,
  (b) a downwardly extending resilient lid sidewall adjoining said raised central portion,
  (c) a flexible surround adjoining and extending outwardly from the downwardly extending resilient lid sidewall,
  (d) an outwardly extending lid flange adjoining and supported by said surround, the outwardly extending lid flange having:
    (1) a lid sealing area formed therein with an annular sealing surface for engaging the frustal sealing surface formed in said container base sidewall;
    (2) a lid stop ridge formed in said flange adjacent said lid sealing area,
  wherein the downwardly extending resilient lid sidewall, flexible surround and the outwardly extending flange are configured to urge the annular sealing surface of said lid into contact engagement with said interior annular sealing surface of said container base while the lid stop ridge and base stop ridge are configured to retain the lid sealing area and container base sealing area in engagement with each other.

45. The food container according to claim 44, wherein said annular sealing surface of said lid is a frustal tapered sealing surface.

46. The food container according to claim 44, wherein said domed lid is provided with a plurality of ridges operative to impart rigidity to said lid.

47. The food container according to claim 44, wherein said container base is fabricated from a thermoplastic material by way of a technique selected from the group consisting of injection molding, injection blow molding, injection stretch molding and composite injection molding.

48. The food container according to claim 44, wherein said container base is formed from a foamed polymeric material.

49. The food container according to claim 44, wherein said domed lid is fabricated from a thermoplastic material by way of a technique selected from the group consisting of injection molding, injection blow molding, injection stretch molding and composite injection molding.

50. The food container according to claim 44, wherein said domed lid is formed from a foamed polymeric material.

51. The food container according to claim 44, wherein said container base is formed from a sheet of thermoplastic material.

52. The food container according to claim 51, wherein said thermoplastic material is a foamed or solid polymeric material selected from the group consisting of: polyamides, polyacrylates, polysulfones, polyetherketones, polycarbonates, acrylics, polyphenylene sulfides, acetals, cellulosic polymers, polyetherimides, polyphenylene ethers or oxides, styrene-maleic anhydride copolymers, styrene-acrylonitrile copolymers, polyvinylchlorides and mixtures thereof.

53. The thermoplastic container of claim 51, wherein said thermoplastic material comprises a foamed or solid polymeric material selected from the group consisting of: polyesters, polystyrenes, polypropylenes, polyethylenes and mixtures thereof.

54. The food container according to claim 51, wherein said container base is thermoformed, thermoformed by the application of vacuum or thermoformed by a combination of vacuum and pressure.

55. The food container according to claim 54, wherein said container base is thermoformed by the application of vacuum.

56. The food container according to claim 44, wherein said domed lid is formed from a sheet of thermoplastic material.

57. The food container according to claim 56, wherein said thermoplastic material is a foamed or solid polymeric material selected from the group consisting of: polyamides, polyacrylates, polysulfones, polyetherketones, polycarbonates, acrylics, polyphenylene sulfides, acetals, cellulosic polymers, polyetherimides, polyphenylene ethers or oxides, styrene-maleic anhydride copolymers, styrene-acrylonitrile copolymers, polyvinylchlorides and mixtures thereof.

58. The thermoplastic container of claim 56, wherein said thermoplastic material comprises a foamed or solid polymeric material selected form the group consisting of: polyesters, polystyrenes, polypropylenes, polyethylenes and mixtures thereof.

59. The food container according to claim 56, wherein said domed lid is thermoformed, thermoformed by the application of vacuum or thermoformed by a combination of vacuum and pressure.

60. The food container according to claim 59, wherein said domed lid is thermoformed by the application of vacuum.

61. A sealable food container ensemble with common lidding comprising:
(a) a sealing lid provided with a dome portion and a flexible lid sidewall extending downwardly from said dome portion as well as a lid flange portion extending outwardly with respect to said downwardly extending lid sidewall;
  (i) said lid flange portion defining a lid sealing area with an annular sealing surface extending upwardly with respect to said downwardly extending lid sidewall;
  (ii) said lid flange portion further defining a lid stop ridge, the lid stop ridge being located upwardly with respect to the annular sealing surface of the lid;
(b) a plurality of container bases such as one or more bowls, plates or platters, each of which bases includes a substantially planar container base central portion, a container base sidewall extending generally upwardly and outwardly therefrom and a container base outer flange portion extending outwardly from the sidewall;
   (i) each of the container base sidewalls defining a sealing sidewall recess disposed between said substantially planar central portions of said base serving members and said base outer flange portions, the recess having an inwardly projecting base stop ridge at its upper edge, a shelf at its lower edge and between the base stop ridge and shelf an inwardly facing annular sealing surface at an outer wall of the sidewall recess;
   (ii) wherein the inwardly facing sealing surface of the sealing recess is a frustal sealing surface, extending upwardly and outwardly with respect to the substantially planar central portion of the bases; and
wherein each of said plurality of container bases and said sealing lid are configured such that when said sealing lid is forced downwardly on one of said container bases, said annular sealing surface of said sealing lid is urged into surface-to-surface contact with said container base annular sealing surface and secured by cooperation of said lid stop ridge and said container base stop ridge; said food container ensemble including at least a first container base with a first container interior height and at least a second container base with a second container interior height which differs substantially from said first container interior height.

62. The container ensemble according to claim 61, wherein said first container base and said second container base have substantially identical outer profiles extending from their respective container base stop ridges to their outermost peripheral portions.

63. The container ensemble according to claim 61, wherein said self extends substantially horizontally outwardly with respect to said substantially planar container base central portion at about its container base interior height and wherein said first container base and said second container base have substantially identical outer profiles extending from the inner edge of their shelf portions to their outermost peripheral portions.

64. The container ensemble according to claim 61, wherein said sealing lid comprises polypropylene and contains a colorant selected from the group consisting of black iron oxide and phthalocyanine green.

65. The container ensemble according to claim 61, wherein said plurality of container bases comprise polypropylene and contain a colorant selected from the group consisting of black iron oxide and phthalocyanine green.

66. The container ensemble according to claim 61, wherein said sealing lid is formed of oriented polystyrene.

67. The food container ensemble according to claim 61, wherein the annular surface of said lid is a frustal sealing surface extending upwardly and outwardly with respect to said downwardly extending lid sidewall.

68. The container ensamble according to claim 67, wherein said frustal sealing surfaces of said plurality of container bases define the same characteristic frustal angle, $\alpha_S$, with respect to a vertical from their respective substantially planar container base central portions.

69. The food container ensemble according to claim 68, wherein the frustal angle, $\alpha_S$, is from about 30 to about 50 degrees.

70. The container ensemble according to claim 68, wherein the frustal angle, $\alpha_S$, is about 35 degrees.

71. The food container ensemble according to claim 68, wherein said sealing lid is formed of oriented polystyrene.

72. The food container ensemble according to claim 61, wherein said first container base is characterized by an inclined lower sidewall portion extending from its substantially planar container base central portion to its container base sealing surface at a first lower sidewall angle with respect to a vertical from its substantially planar container base central portion and said second container base is characterized by an inclined lower sidewall portion extending from its substantially planar container base central portion to its container base sealing surface at a second lower sidewall angle with respect to a vertical from its substantially planar container base central portion wherein said second lower sidewall angle is substantially different from said first lower sidewall angle.

73. The food container ensemble according to claim 72, wherein said first container base is a plate having a lower sidewall angle of from about 30 to about 50 degrees and said second container base is a bowl having a lower sidewall angle of from about 10 to about 25 degrees.

74. The food container ensemble according to claim 73, wherein the ratio of the overall height of said bowl to the overall height of said plate is from about 2.5 to about 4.0.

75. The food container ensemble according to claim 73, wherein said plate has a lower sidewall angle of about 35 degrees.

76. The food container ensemble according to claim 73, wherein said bowl has a lower sidewall angle of about 20 degrees.

77. The container ensemble according to claim 61, wherein said first container base is a circular bowl and said second container base is a circular plate each of which have substantially equal radii from their centers to their container base stop ridges and said bowl has an overall height of at least twice the overall height of said plate.

78. The container ensemble according to claim 77, wherein said outer flange portions of said bowl and plate are upwardly convex.

79. The container ensemble according to claim 78, wherein said outer flange portions have an inner radius of curvature which is greater than an outer radius of curvature of said outer flange portions.

80. A sealable food container comprising:
   (a) a base serving member having a substantially planar central portion, a sidewall extending generally upwardly and outwardly therefrom and a base outer flange portion extending outwardly from said sidewall;
      (i) said sidewall defining a sealing sidewall recess disposed between said substantially planar central portion of said base serving member and said base outer flange portion, the recess having; an inwardly projecting base stop ridge at its upper edge; a sidewall shelf at its lower edge; and between the base stop ridge and shelf, an inwardly facing annular sealing surface at an outer wall of the sidewall recess;
      (ii) wherein the sidewall shelf extends inwardly further than the base stop ridge at the upper edge of the recess extends inwardly; and
   (b) a sealing lid provided with a dome portion and a flexible sidewall extending downwardly from said dome portion as well as a lid flange portion extending outwardly with respect to said downwardly extending sidewall;
      (i) said lid flange portion defining a sealing area with an annular sealing surface extending upwardly with respect to said downwardly extending sidewall of said sealing lid;

(ii) said flange portion further defining a lid stop ridge;
wherein said base serving member and said sealing lid are configured such that when said sealing lid is forced downwardly on said base serving member, the lid is positioned on the shelf and said sealing surface of said sealing lid is urged into surface-to-surface contact with said frustal sealing surface of said base serving member by way of the inwardly disposed configuration of the lid with respect to the seal and the lid and base are secured by cooperation of said base stop ridge of said base serving member and said lid stop ridge of said sealing lid.

* * * * *

UNITED STATES PATENT AND TRADEMARK OFFICE
CERTIFICATE OF CORRECTION

PATENT NO.      : 6,733,852 B2
DATED           : May 11, 2004
INVENTOR(S)     : Mark B. Littlejohn et al.

It is certified that error appears in the above-identified patent and that said Letters Patent is hereby corrected as shown below:

Title page,
Item [57], ABSTRACT,
Line 2, change "planer" to -- platter --; and
Line 2, change "howl" to -- bowl --.

Column 1,
Line 48, delete "10";

Column 3,
Line 34, delete ".";

Column 4,
Line 24, change "mica filled" to -- mica-filled --;

Column 5,
Line 59, change "49" to -- 40 --;

Column 6,
Line 28, change "This" to -- That is --;
Line 29, change "correspond" to -- corresponds --;
Line 30, change "to" to -- so --;
Line 61, change "that" to -- than --;

Column 7,
Line 61, change "pyrophilite" to -- pyrophillite --;

Column 10,
Line 17, change "Phthaiocyanine" to -- Phthalocyanine --;
Line 31, change "included" to -- include --;
Lines 66-67, change "styrene butadiene styrene, diethylene butadiene styrene" to
-- styrene-butadiene-styrene, diethylene-butadiene-styrene --;

Column 12,
Line 8, change "==$_s$" to -- $\alpha_s$ --;
Line 66, change "is" to -- are --;

Column 13,
Line 9, change "as" to -- $\alpha_s$ --;
Line 16, change "tic" to -- 11C --;

UNITED STATES PATENT AND TRADEMARK OFFICE
CERTIFICATE OF CORRECTION

PATENT NO. : 6,733,852 B2
DATED : May 11, 2004
INVENTOR(S) : Mark B. Littlejohn et al.

It is certified that error appears in the above-identified patent and that said Letters Patent is hereby corrected as shown below:

Column 19,
Line 35, change "self" to -- shelf --.

Signed and Sealed this

Thirteenth Day of July, 2004

JON W. DUDAS
*Acting Director of the United States Patent and Trademark Office*